United States Patent [19]
Chacon

[11] 3,870,829

[45] Mar. 11, 1975

[54] AUDIO-COMMUNICATION SYSTEM HAVING A PLURALITY OF INTERCONNECTED STATIONS

[75] Inventor: Manuel Frank Chacon, Mequon, Wis.

[73] Assignee: Johnson Service Company, Milwaukee, Wis.

[22] Filed: Nov. 8, 1972

[21] Appl. No.: 304,612

[52] U.S. Cl. ...................... 179/30, 179/38, 179/1 H

[51] Int. Cl. ............................................ H04m 9/02

[58] Field of Search ............ 179/37, 38, 1 H, 1 HF, 179/81 B, 1 VC, 15 AN, 1 CN, 28, 30; 320/1

[56] References Cited

UNITED STATES PATENTS

| | | | |
|---|---|---|---|
| 2,567,484 | 9/1951 | Ivens | 179/1 HF |
| 3,300,759 | 1/1967 | Chapman | 340/150 |
| 3,499,115 | 3/1970 | Sontag | 179/1 HF |
| 3,740,487 | 6/1973 | Ter Veen | 179/37 |

*Primary Examiner*—Kathleen H. Claffy
*Assistant Examiner*—Joseph A. Popek
*Attorney, Agent, or Firm*—Andrus, Sceales, Starke & Sawall

[57] ABSTRACT

An audio-communication system includes a single pair of connecting lines between a master station and a plurality of remote stations. Each station includes a locally powered differential amplifier having a high input impedance and a low output impedance. Switches connect a microphone or a speaker to the amplifier and the lines. The master station includes a D.C. signal source connected to the lines and the remote stations include line reversal circuits responsive to a DC signal to establish a listen condition such that the remote station provides hand-free communication. A line discharge circuit is connected to the lines at the master station and automatically discharges line capacitance when the listen mode is set at the master station.

17 Claims, 3 Drawing Figures

AUDIO-COMMUNICATION SYSTEM HAVING A PLURALITY OF INTERCONNECTED STATIONS

BACKGROUND OF THE INVENTION

The present invention relates to an audio-communication system including a plurality of interconnected stations and, in particular, including at least one master station and a plurality of interconnected remote stations.

With the development of large working and living complexes, local intercom or audio-communication systems are widely employed to permit communication between various spaced locations in a single building or a complex of closely adjacent buildings. Such building complexes may employ interrelated environmental control systems for conditioning of the building air space. Generally, a master station is provided to monitor the operation of the relatively complex environmental control apparatus, with various sensing devices at remote locations providing continuous or intermittent information to the master station. In the monitoring and controlling operation, as well as in the repair and maintenance of the total system, audio-intercommunication between the master station and the remote station is essential for practical operation and functioning. Generally, audio-communication systems employ centrally powered high impedance amplifiers at the central station. The master station should be able to contact one or more remote stations as desired and transmit audio-information without requiring action by the personnel at the remote station. Although such systems have been employed, the increase in the size of the communication systems and particularly the number of locations and the increased separation between the several stations, have limited the effectiveness of the system. For example, the length of the interconnecting lines result in excessive losses and group communication has proved difficult in group or total paging.

SUMMARY OF THE PRESENT INVENTION

The present invention is particularly directed to a multiple station intercommunication system which provides reliable operation over relatively long interconnecting lines and permits the simultaneous driving of a significant plurality of stations from at least one master station. In accordance with a further aspect of the present invention, a single wire pair interconnects the plurality of remote stations to the master station. Generally, in accordance with the teaching of the present invention, each station including the master and the remote stations includes a locally powered common transmitter and receiver amplifier, with the master and remote station elements interconnected by a single twisted wire pair of a shielded cable. The amplifier is preferably a differential amplifier and is particularly selected to have a high input impedance and a low output impedance. Each of the stations includes a switch means having a first and second state for selectively interconnecting of a microphone means and a speaker means, as audio transmitting and audio receiving means, to such differential input amplifier to respectively transmit and receive audio signals. The master station includes a command or remote control means to establish a signal on the lines to all of the interconnected operative remote stations which include a line reversal circuit responsive to such signal to automatically and selectively switch them from a preset audio transmission mode to an alternate audio receiving mode. In a particularly novel aspect, the line reversal is accomplished by establishing a DC signal on the lines. The line reversal circuits similarly include a high impedance resistive network connecting the lines to a DC operational amplifier which drives a switching means to switch the system from a talk to a listen mode, and in particular to remove a microphone from the self-powered amplifier and interconnect a speaker thereto. Thus, while the master station is controlling the operation of the remotes, personnel at the remote station do not have to actuate any of the controls and the system provides hand-free communication.

During the master to remote transmitting condition, relatively large line capacitive charged will generally be developed as a result of the DC control signal. In accordance with the present invention, an automatic line discharge circuit is interconnected to the transmission lines at the master station and interconnected into the circuit by the switch means to provide for automatic discharge of the capacitive charge upon switching from a talk to a listen mode at the master station. This provides for the rapid discharge of any line capacitance and permits unimpaired audio-signal transmission. The master station may, therefore, selectively transfer the connection of the speaker and microphone means for transfer between listen and talk modes at each of the remotes. Manually actuated means are also provided at the remote stations to permit manual changeover between the listen and talk modes. In addition, the several remote stations are selective interconnected to the single twisted pair cable through a coded latch switching circuit which can be manually controlled at each of the remote stations and also are selectively controlled from the master station through a suitable coded output. The selection can be provided in any suitable means, for example, as shown in issued U.S. Pat. No. 3,300,759 of William P. Chapman et al.

The present invention has been found to provide an intercommunication system which can operate over a relatively long interconnecting pair of lines and can simultaneously drive a substantial number of remote stations.

BRIEF DESCRIPTION OF THE DRAWING

The drawing furnished herewith illustrates a preferred construction of the present invention in which the above advantages and features are clearly disclosed as well as others which will be readily understood from the description of such embodiment.

In the drawing.

DESCRIPTION OF ILLUSTRATED EMBODIMENT

Figure 1:
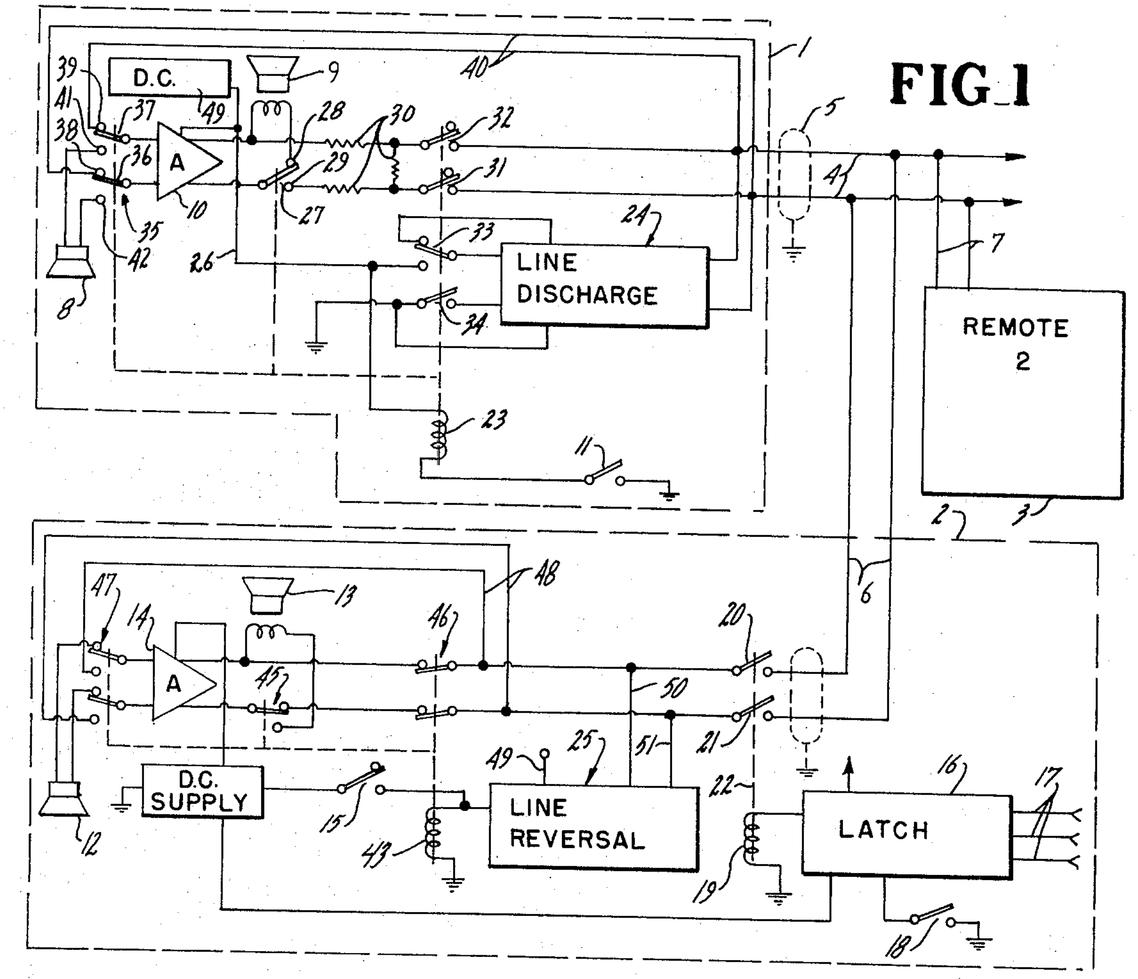
FIG. 1 is a schematic illustration of an intercommunication system constructed in accordance with the present invention, with certain components shown in block diagram.

Referring to the drawing and particularly to FIG. 1, a multiple station audio communication system constructed in accordance with the present invention is shown including a single master station 1 connected to a plurality of remote stations of which a pair 2 and 3 are illustrated. The master station 1 is interconnected to the several remote stations by a single cable unit including a pair of lines 4 which preferably are a single twisted pair within a shielded cable as diagrammatically shown at 5. Station 2 is connected to lines 4 by a shielded cable 6 and station 3 is similarly connected by shielded cable 7. Thus, each of the remote stations 2 and 3 are similarly constructed and connected to the master station and only station 2 is shown in detail and described. Other remotes may be similarly constructed and connected into the intercommunication system.

The master station 1 is constructed for both transmitting and receiving audio signals and includes a suitable microphone 8 and a speaker 9 selectively interconnected through a switching means to a differential amplifier 10 which in turn is selectively connected to the transmission lines 4. The connection is determined by a manually operated switch 11 which has a normal open listen position, as shown in full line illustration, connecting the speaker 9 through amplifier 10 to the lines 4 and a talk position in which the speaker 9 is disconnected from the circuit and the microphone 8 is connected to the amplifier 10, the output of which is then connected to the lines 4.

The remote station 2 is similarly constructed with a microphone 12 and a speaker 13 interconnected to a selfpowered differential audio amplifier 14 to permit corresponding connection to the lines 6 for transmitting and receiving sound signals.

The remote station 2 also includes a manually operable selection switch 15 having a normal open talk position in which the microphone is connected as the input to the amplifier 14, the output of which is connected directly to lines 6. The alternate listen position of switch 15 reverses the connection of the microphone and the speaker as well as the connection of the audio amplifier to the lines 6. Further, the remote station 2 is selectively connected to the lines 6 through a latch circuit 16 of any suitable construction. Generally, it will include a coded input shown by the three digital input lines 17 for example, as shown in U.S. pat. No. 3,300,759. A manual latch switch 18 is also provided at the remote station for actuating the latch circuit 16 by personnel thereat for selective connection and disconnection from the master station. The output of the latch circuit 16 drive a relay 19 having a set of switches 20 and 21, as shown by the dashed line 22, connected to the remote station lines 6. With the latch circuit energized, the remote station 2 is connected for audio-communication with the master station 1.

The master station switch 11 is connected to selectively control a relay 23 which controls a multiplicity of contacts and provides for selective connection of a line charge and discharge circuit 24 to the lines 4 for selectively conditioning of the system for operative transmission of signals to the remote stations and receipt of signals from the remote stations. The switch 11 in the talk position connects line charge and discharge circuit 24 to transmit a DC signal from a DC supply lines 26 at the master station 1 over the commmon pair of lines 4 to actuate a line reversal circuit 25 at the remote station 2. The output of the circuit 25 simulates actuation of the switch 15 and automatically reverses the connection of the microphone and the speaker at the remote station 2 with respect to the audio amplifier 14 for sound reception from the master station 1.

In the normal position of switch 11, the line discharge circuit 24 is actuated to open the DC power supply connection to lines 4 and thereby permit audio signal transmission from the remote to the master station. Suitable illuminating lamps or other indicators, not shown, may be provided to indicate the status at the respective stations and to draw attention to that condition.

More particularly in the illustrated embodiment of the invention, master station relay 23 is connected between the DC supply lines 26 and ground in series with the switch 11 and actuates a first single pole double throw switch having a contact arm 27 forming a common connection to one side of the audio amplifier 10. The contact arm 27 selectively engages a contact 28 to connect the speaker 9 across the output of the audio amplifier and a second contact 29 to connect the output of the audio amplifier to transmit a signal over the lines 4. The sound transmission circuit includes a set of coupling resistors 30 connected in series and across the lines. The relay 23 also includes a pair of single pole double throw switches 31 and 32 connected in lines 41 to complete the output connection. A set of single pole double throw contacts or switches 33 and 34 are coupled to relay 23 and selectively connect the DC lines 26 to the circuit to transmit the DC signal over the lines 4 for operating of the line reversal circuit 25.

The relay 23 further controls a bank of switches 35 for reversing the connection between microphone 8, the input of the audio amplifier 10 and the lines 4. Switch bank 35 is a double pole double throw switching arrangement including a pair of common pole arms 36 and 37 connected respectively to the differential input of the audio amplifier 10. Contact arms 36 and 37 in the de-energized state engage contacts 38 and 39 connected respectively by lines 40 directly to lines 4. Thus, in the normal state the lines 4 are connected as the input to the audio amplifier 10. When the relay 23 is energized, the contact arms 36 and 37 disengage contacts 38 and 39 and alternately engage contacts 41 and 42 to directly connect the microphone 8 across the input to the amplifier 10. The amplifier 10 thus amplifies any speech received by the microphone 8 and transmits it via the switch assembly 27–29, the resistor network 30, the switches 31 and 32 and lines 4 to activated remote stations 2 and 3.

The remote station 2 has the latch circuit 16 actuated to operatively connect the lines 6 to the lines 4 and receives the signals transmitted over lines 4. The DC level signals are applied to the line reversal circuit 25 to actuate the relay 43. The relay 43, upon operation, controls a first set of contacts 45 which connect the speaker 13 to the output of the audio amplifier 14 and disconnects the output of the amplifier from the lines 6 in series with a second bank of switches 46 and the switches 20 and 21 of the latch circuit 16. The relay 43 also controls a set of double-pole double-throw switches 47 disconnecting the microphone 12 and connecting coupling lines 48 to the input of the audio amplifier 14. This simulates the actuation of the switch 15 to the listen position and operates the contacts to reverse the connection of the microphone 12, the speaker 13 and the lines 6 with respect to the audio amplifier 14 to change from a transmitting condition to a listening condition. Thus, simultaneously with the actuation of the master station switch 11 to the talk position, any coupled remote station 2 is automatically actuated through the line reversal 25 to set the remote station in a listen position.

Each of the stations, including the master and all remote stations have a local power supply 49 for driving of the audio amplifier and the several interrelated control circuits. Further, the audio amplifiers are high input impedance and low output impedance amplifiers. for example, differential input amplifiers operating as class "A" push-pull output units. Each amplifier amplifies only the AC audio signals and the signal is always from a low source impedance to a high load impedance. The driver amplifier may readily transmit signals over reasonable long distances and to a plurality of stations because of the low characteristic impedance, while the high input impedance of the loads in all cases affords minimal line loading. This permits practical application of the system to an audio communication system having relatively long connecting lines and a relatively large number of simultaneously driven remote stations.

Return of the control switch 11 at the master station 1 to the listen condition (open contacts) causes automatic reversal of the circuitry to the full line position illustrated. The line discharge circuit 24 is triggered by the operation of switches 33 and 34, as relay 23 deenergizes, to provide for an automatic discharge of any stored energy as a result of capacitance in the twisted lines 4 such that the audio signals from the remote stations can now be transmitted to the master station.

At the remote station 2, personnel can also establish the manual latch switch and control the talk-listen switch 15. At the remote station, the system is preferably constructed to bias the switches 15 at least to the talk position and require positive holding of the switch to the listen position when under remote control. Hands-free listening is only possible under control from the master station, or stations, with an automatic line reversal control at the several remote stations.

Figure 2:
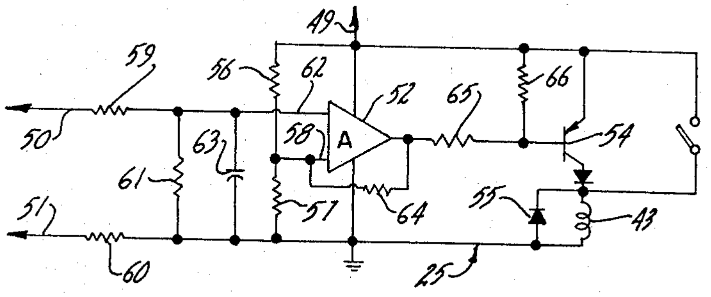
FIG. 2 is a schematic circuit of a line reversal circuit shown in block diagram in FIG. 1.

A preferred and novel construction of a line reversal circuit 25 is shown in FIG. 2. The preferred circuit includes a set of input lines 50 and 51 connected directly across the audio coupling lines 6 at the remote station 2 and as the input to an operational amplifier 52, powered from the local DC supply 49. The output of the operational amplifier 52 is connected to energize a driver switch means 54 which is shown as a conventional PNP transistor. The transistor 54 is connected in series with relay 43 to the supply 49 with a polarity protective diode 55 connected across the coil in accordance with the usual construction. The manual talk-listen switch 15 is connected in parallel with the transistor drive switch 54 to provide for direct energization of the coil 43 from the lower power supply 49.

A DC reference signal means is applied to the non-inverting input of operational amplifier 52 an in particular includes a pair of voltage dividing resistors 56 and 57 connected between the positive supply 44 and the common reference ground. The inverting input 58 is connected to the junction of the resistors 56 and 57 and provides a corresponding reference signal to the operational amplifier.

More particularly, the circuit is resistance coupled to the incoming signal by a pair of series resistors 59 and 60 in lines 50 and 51 and a parallel resistor 61 to provide a high impedance resistive coupling. Thus, the resistors may each be of the order of 10 megohms to provide a 30 megohms resistance load on the lines. The DC positive signal line 50 is connected by resistor 59 to the inverting input 62 with a transient protection capacitor 63 connected between the inverting input and the common ground. The opposite signal line 51 is connected to the circuit common.

The operational amplifier includes the conventional feedback resistor 64 between the output and the inverting input 58. The amplifier 52 compares the DC level signal on the line 50 with the reference signal and produces a single ended output in accordance with the relative level of the input signals. A coupling resistor 65 connects the output of the amplifier to the base input of the transistor 54 and to the positive power supply 44 through the coupling or base to emitter drive resistor 66. Thus, in the normal stand-by condition, the reference signal at input 58 is at a selected voltage such as three volts while the inverting input voltage at reference line 50 is essentially zero. This results in a relatively positive or large voltage output of the amplifier which back biases the transistor 54 and holds the relay 43 in the deenergized state. When the master station 1 is placed in a talk position and connects relatively large voltage such as fifteen volts DC across the audio transmission lines 4, a corresponding voltage appears across the high impedance voltage divider consisting of the resistors 59–61. The input voltage at input 62 rises above the level of the non-inverting input at input 58 for example, to a voltage of approximately 5 volts. The operational amplifier 52 rapidly switches to a low essentially zero ouput voltage. This, of course, results in a corresponding change from a high to a low voltage to the non-inverting input 58 to create a regenerative and rapid switching action. It also permits a current path from resistor 65 to ground and thus develops a turn-on voltage across the resistor 66 which appears across the emitter to base junction of the transistor 54 which turns on. The driver transistor 54 saturates and provides for rapid and full energization of the line reversal relay 43. The circuit will be held in this state as long as the DC voltage is applied to the operational amplifier 52 from the master station 1.

When such signal is removed, the operational amplifier 52 will rapidly switch in the opposite direction to turn off the driver transistor 54, deenergize relay 43 and reset the remote station reversal circuit 25 to again place the remote station 2 in the talk position. Thus, when the master station is returned to the listen position the remote stations are rapidly returned to the talk position under the automatic control.

Simultaneously with return to the listening position, the circuit 24 at the master station discharges the capacitance of the lines 4 and thereby facilitates the transmission of the audio signals from the remote to the master station.

Figure 3:
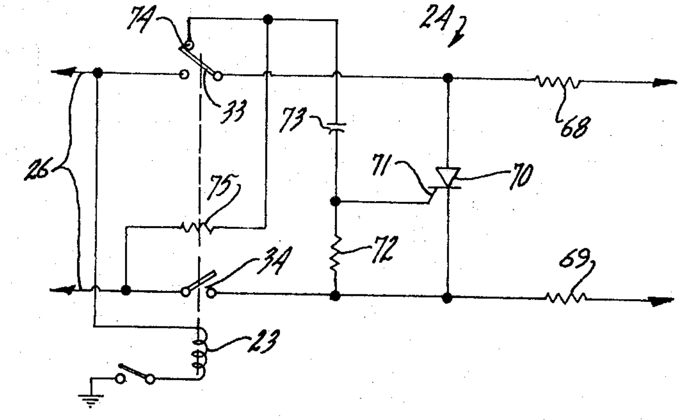
FIG. 3 is a similar view of an automatic line signaling and discharging circuit shown in block diagram in FIG. 1.

A preferred line discharge circuit 24 is shown in FIG. 3. The DC supply lines 26 are connected to circuit 24 via the switches 33 and 34 of the relay 23. In the alternate or talk position, the switches 33 and 34 directly connect lines 26 in series with respective resistors 68 and 69 to the audio transmission lines 4. When the relay 23 is energized to close the associated switches, a DC power signal is impressed through the dropping resistors across the voltage lines 4 and establishes the DC voltage signal to actuate the line reversal circuits 25 at each remote station.

When the switch 11 is returned to the listen position, the relay 23 is deenergized and the contact switches 33 and 34 revert to the full line position, disconnecting the DC supply from the lines 4 and interconnecting a discharge branch circuit across lines 4 to discharge any charge on the lines 4. In particular, the line discharge branch circuit includes a controlled rectifier 70 connected directly across the two coupling lines to the input side of the resistors 68 and 69. The gate 71 of the control rectifier 70 is connected to a pulsing network including a resistor 72 connected across the gate to cathode circuit of the controlled rectifier. A capacitor 73 is connected between the gate and a contact 74 of the relay switch 33. In the listen position, the contact 74 is connected to the positive side of line resistor 68. Thus, the capacitor 73 in series with the resistor 72 is connected directly across the lines 4. Any charge on the lines 4 will thus be applied across the capacitor 73 and the resistor 72 and begin to charge the capacitor 73. It will rapidly charge to the firing level of the controlled rectifier 70. Once the controlled rectifier 70 has been fired, it will of course discharge the capacitive charge on the lines 4 as a result of the creation of an essentially short circuit across the lines in series with resistors 68 and 69. The controlled rectifier 70 returns to the off or blocking condition when the charge current drops below the holding level of the rectifier. Any residual charge on the capacitor 73 is discharged upon movement of the relay 23 to the talk position shown. A resistor 74 is connected between the top side of the capacitor 73 and the ground side of the power supply. Thus, when the switch 34 is closed to the talk position, the capacitor 73 in series with the resistors 72 and 75 is connected directly across the closed switch 34. This, then short circuits the capacitor 73 to rapidly discharge it with the energy being dissipated through the resistors.

In summary, under normal conditions the master station 1 is held in a listen mode and the remote line 6 are open ended at the remote station or stations. Thus, all of the selective latch circuits 16 are open and the remote units are held in a talk mode. The communication between a remote station 2 and a master station 1 is established either by the master command through the automatic actuation of latch circuit 16 via the code lines 17, or by the command of an operator at remote locations by actuation of the manual latch switch 18.

During the automatic mode, the operation at the remote stations is completely hand-free because the master station operator continuously monitors and automatically selects the master talk and remote listen or the remote talk and master listen condition of transmission.

Under all conditions, the microphones 8 and 12 and the speakers 9 and 13 are properly connected via the corresponding self-powered amplifiers 10 and 14 to the lines 4. As each of the amplifiers 10 and 14 is similarly constructed as a high input impedance and low output impedance device they can readily drive the audio signals over relatively long lines and to a multiplicity and significant number of stations. Further, they do not load the lines excessively and readily amplify the incoming signals. The DC signalling of the remote stations in combination with the means to discharge any capacitance stored in the system provides a reliable signalling and multiplexing of the DC control signal and the audio signals while maintaining reliable and long life operation.

The present invention thus provides an audio communication system which is particularly adapted to master and multiple remote stations and has been advantageously applied to provide audio communication in a large environmental control.

Various modes of carrying out the invention are contemplated as being within the scope of the following claims, particularly pointing out and distinctly claiming the subject matter which is regarded as the invention.

I claim:

1. A multiple station audio communication system, comprising a plurality of spaced stations, a single pair of transmission lines interconnecting said stations, an audio transmitting device at each station, an audio receiving device at each station, an amplifier at each station having a relatively high impedance input means and a low impedance output means, said amplifier having a local power supply, and a talk-listen switch means at each station having a first state connecting said input means of said amplifier to said audio transmitting device and the output means to said transmission line pair and having a second state connecting the input means of said audio amplifier to said transmission lines and the output of said amplifier to the said related audio receiving device.

2. The multiple station audio communication system of claim 1 wherein at least one of said stations constitutes a master station having a remote control means for superimposing a control signal on said transmission lines for simultaneous transmission of said control signal to said other stations as controlled remote stations, each of the remote stations having a line reversal circuit having a signal sensing network responsive to said control signal and an output driving means coupled to the corresponding switch means to reverse the position thereof.

3. The audio communication system of claim 1 wherein each remote station includes a latch circuit means for connecting and disconnecting of the corresponding remote station to the transmission lines, said latch circuit means having a local input means continuously biased to a disconnect position and a coded input means connected to the master station and responsive to a selected input to connect the remote station to said transmission lines.

4. The communication system of claim 2 wherein the control signal is a direct current signal and said master station includes discharge means connected to said transmission lines and responsive to selected actuation of said switch means at the master station to said second state for establishing a momentary direct current discharge circuit at the master station across said transmission lines for discharging capacitive energy stored in said transmission lines.

5. The communication system of claim 4 wherein discharge means includes a gated solid state switch connected across said transmission lines and a gating network operatively connected across said transmission lines with said switch means in said second state.

6. The communication system of claim 2 wherein control signal is a direct current voltage and said remote control means includes a line charge and discharge circuit, second switch means coupled to said first switch means at said master station and actuated simultaneously therewith, said line charge and discharge circuit having a pair of current limiting resistors connected to said transmission lines and to a direct current supply by said second switch means, said discharge circuit including an electronic switch connected across said lines to the input side of said resistors, a capacitor in series with a sensing resistor connected across said electronic switch means in series with said second switch means and establishing a signal at the junction of the capacitor and sensing resistor to fire said electronic switch means, a discharge resistor connected across said capacitor and resistor in series with the said second switch means to discharge any residual capacity in the capacitor upon switching of the master station to the talk position.

7. The communication system of claim 6 wherein said first state of said second switch means is a master station talk position and said second state is a master station listen position.

8. The communication system of claim 2 wherein said control signal is a direct current voltage and said line reversal circuit includes an operational amplifier having a first input, a high impedance coupling circuit means connected to said first input and to said transmission lines, said amplifier having a second input connected to a DC reference voltage at the corresponding station, the output of said operational amplifier being coupled to control an electronic driver stage in series with said switch means, and a manual control switch connected in parallel with said electronic driver stage to provide for direct energization of the switching means operator.

9. The communication system of claim 2 wherein the control signal is a direct current voltage and said remote control means includes a direct current supply, second switch means coupled to said first talk-listen switch means and actuated simultaneously therewith, a pair of current limiting resistors connected to said transmission lines and to said direct current supply by said second switch means, a discharge circuit including a gated unidirectional electronic switch connected across said lines, a gating circuit connected to actuate said electronic switch to discharge stored energy on said transmission lines, said second switch means selectively connecting said gating circuit across said transmission lines, said line reversal circuit includes an operational amplifier having a first high impedance input connected to said transmission lines and a second input connected to a direct current reference voltage at the corresponding station, the output of said operational amplifier being coupled to control an electronic driver in series with said talk-listen switch means, and a manual control switch connected in parallel with said electronic driver to provide for direct energization of the corresponding talk-listen switch means.

10. The communication system of claim 9 wherein said high impedance input includes a pair of series coupling resistors and a parallel resistor connected between said transmission lines and the inputs of operational amplifier.

11. The communication system of claim 9 wherein said gated electronic switch is a controlled rectifier means connected across said direct current supply and to said transmission lines in series with said resistors, said gating circuit includes a firing capacitor in series with a sensing resistor connected across said controlled rectifier in series with said second switch means and having the junction of the capacitor and sensing resistor connected to the gate of the rectifier means.

12. The communication system of claim 11 having a discharge resistor connected across said capacitor and resistor in series with said second switch means to discharge any residual capacity in the firing capacitor upon movement of the master station switch means to a selected position.

13. A multiple station audio communication system, comprising a plurality of spaced stations, a single pair of transmission lines interconnecting said stations, audio transmitting means at each station, audio receiving means at each station, an amplifier at each station having a relatively high impedance input means and a low impedance output means, said amplifier having a local power supply, switch means at each station for selectively connecting said audio transmitting means and said audio receiving means to said amplifier and said amplifier to said transmission lines for selectively and alternatively transmitting and receiving voice signals over said transmission lines, at least one of said stations constituting a master station having a remote control means connected to said other stations as controlled remote stations and each of the remote stations having a line reversal circuit responsive to the remote control means and coupled to the corresponding switch means to reverse the position thereof.

14. The communication system of claim 13 wherein each remote station includes a latch circuit means for selectively connecting said stations to said master station, and a code signal source at the master station for actuating said latch circuit means.

15. The system of claim 13 wherein said remote control means establishes a direct current voltage signal and said line reversal circuit includes an operational amplifier having a first input, a high impedance coupling circuit means connected to said first input and to said transmission lines, said operational amplifier having a second input connected to a direct current reference voltage at the corresponding station, the output of said operational amplifier being coupled to control said switch means, and a manual control means at the remote station connected to provide for direct energization of the switch means.

16. A multiple station audio communication system, comprising a plurality of spaced stations having audio transmitting and audio receiving devices at each station, transmission lines connecting said stations, switch means at each station for selectively connecting said audio transmitting device and said audio receiving device to said transmission lines, at least one of said stations constituting a master station having a remote control means and having a direct current source for superimposing a DC control signal on said transmission lines for simultaneous transmission of said control signal to said other stations as controlled remote stations, each of the remote stations having a line reversal circuit including a DC signal sensing network and an output driving means coupled to the corresponding switch means to reverse the position thereof, said master station having a line discharge means for discharging of the DC energy stored in the transmission lines, and switch means selectively connecting the direct current source and the line discharge means to the transmission lines.

17. The communication system of claim 16 wherein said switch means are coupled to a common actuator to connect said source to the lines in synchronism with the audio transmitting device and to connect said discharge means to the lines in synchronism with the audio receiving device.

* * * * *